United States Patent
Kondo

(10) Patent No.: US 10,919,387 B2
(45) Date of Patent: Feb. 16, 2021

(54) DRIVING FORCE TRANSMISSION CONTROL APPARATUS

(71) Applicant: JTEKT CORPORATION, Osaka (JP)

(72) Inventor: Hirokazu Kondo, Takahama (JP)

(73) Assignee: JTEKT CORPORATION, Osaka (JP)

( * ) Notice: Subject to any disclaimer, the term of this patent is extended or adjusted under 35 U.S.C. 154(b) by 261 days.

(21) Appl. No.: 16/127,740

(22) Filed: Sep. 11, 2018

(65) Prior Publication Data
US 2019/0077257 A1 Mar. 14, 2019

(30) Foreign Application Priority Data

Sep. 12, 2017 (JP) ................................. 2017-174520

(51) Int. Cl.
*B60K 23/04* (2006.01)
*B60K 17/356* (2006.01)
(Continued)

(52) U.S. Cl.
CPC .............. *B60K 23/04* (2013.01); *B60K 5/04* (2013.01); *B60K 17/20* (2013.01); *B60K 17/344* (2013.01); *B60K 17/3462* (2013.01); *B60K 17/35* (2013.01); *B60K 17/356* (2013.01); *B60K 23/08* (2013.01); *B60K 23/0808* (2013.01); *F16H 48/40* (2013.01); *B60K 2023/0833* (2013.01); *B60W 10/06* (2013.01); *B60W 20/30* (2013.01); *B60W 2520/28* (2013.01)

(58) Field of Classification Search
CPC .... B60K 23/04; B60K 23/08; B60K 23/0808; B60K 17/3462; B60K 2023/0833; F16H 59/46; B60W 10/119; B60W 10/14; B60W 2510/0291; B60W 2520/263; B60W 2520/28; B60W 2720/403

See application file for complete search history.

(56) References Cited

U.S. PATENT DOCUMENTS 5,742,917 A * 4/1998 Matsuno ................ B60K 23/04
701/69
2009/0127014 A1* 5/2009 Ushiroda ............ B60W 30/045
180/249

(Continued)

FOREIGN PATENT DOCUMENTS

JP 2010-241210 10/2010

*Primary Examiner* — Edwin A Young
(74) *Attorney, Agent, or Firm* — Oblon, McClelland, Maier & Neustadt, L.L.P.

(57) ABSTRACT

A control apparatus configured to control a driving force transmission apparatus. The control apparatus includes a torque command value calculator configured to calculate a torque command value for the right and left rear wheels based on a front-rear wheel rotation speed difference, a command value limiter configured to limit the torque command value to a value equal to or smaller than an upper limit value, and a current controller configured to control a current to be supplied to the driving force transmission apparatus so that a driving force determined based on the torque command value is transmitted to the right and left rear wheels. When the front-rear wheel rotation speed difference increases, the command value limiter sets the upper limit value smaller as a change amount of the front-rear wheel rotation speed difference per unit time increases.

7 Claims, 8 Drawing Sheets

(51) Int. Cl.
    *B60K 17/346*    (2006.01)
    *F16H 48/40*     (2012.01)
    *B60K 17/16*     (2006.01)
    *B60K 23/08*     (2006.01)
    *B60K 17/35*     (2006.01)
    *B60K 17/344*    (2006.01)
    *B60K 5/04*      (2006.01)
    *B60W 10/06*     (2006.01)
    *B60W 20/30*     (2016.01)

(56)            References Cited
            U.S. PATENT DOCUMENTS

| | | | |
|---|---|---|---|
| 2010/0252348 A1 | 10/2010 | Ueda et al. | |
| 2013/0304341 A1* | 11/2013 | Sakaguchi | B60W 30/1846 |
| | | | 701/69 |
| 2014/0074368 A1* | 3/2014 | Stares | B60W 10/119 |
| | | | 701/69 |

* cited by examiner

DRIVING FORCE TRANSMISSION CONTROL APPARATUS

INCORPORATION BY REFERENCE

The disclosure of Japanese Patent Application No. 2017-174520 filed on Sep. 12, 2017 including the specification, drawings and abstract, is incorporated herein by reference in its entirety.

BACKGROUND OF THE INVENTION

1. Field of the Invention

The present invention relates to a driving force transmission control apparatus to be mounted on a four-wheel drive vehicle configured to switch between a four-wheel drive mode and a two-wheel drive mode.

2. Description of the Related Art

Hitherto, as a four-wheel drive vehicle configured to switch between a four-wheel drive mode in which a driving force of a drive source is transmitted to main driving wheels and auxiliary driving wheels and a two-wheel drive mode in which the driving force is transmitted only to the main driving wheels, there is provided a four-wheel drive vehicle configured to adjust the driving force to be transmitted to the auxiliary driving wheels by increasing or decreasing an engagement force of a clutch.

In a four-wheel drive vehicle described in Japanese Patent Application Publication No. 2010-241210 (JP 2010-241210 A), in order to reduce the size and weight of a gear unit in a driving force transmission path to auxiliary driving wheels while preventing damage to the gear unit, an upper limit value determined in consideration of the strength of the gear unit is set for a driving force to be transmitted to the auxiliary driving wheels, and a clutch torque is controlled so that the driving force does not exceed the upper limit value.

The driving force to be transmitted by a clutch may temporarily overshoot its target value when the engagement force of the clutch abruptly increases. In order to securely prevent damage to components of the driving force transmission path through which the driving force is transmitted to the auxiliary driving wheels in the four-wheel drive vehicle including the control system described in, for example, JP 2010-241210 A, it is necessary that the upper limit value be set relatively smaller in consideration of the overshoot in the driving force to be transmitted. For example, when the engagement force of the clutch gently increases, this setting of the upper limit value limits the driving force to be transmitted to the auxiliary driving wheels more than necessary. Therefore, there is a possibility that an effect of increasing the driving stability of the four-wheel drive vehicle by distributing the driving force to the auxiliary driving wheels cannot be exerted sufficiently.

SUMMARY OF THE INVENTION

It is one object of the present invention to provide a driving force transmission control apparatus that can increase the driving stability of a four-wheel drive vehicle by adjusting an upper limit value of a driving force that can be transmitted to auxiliary driving wheels while securely preventing damage to components of a driving force transmission path through which the driving force is transmitted to the auxiliary driving wheels.

A driving force transmission control apparatus according to one aspect of the present invention includes:

a driving force transmission apparatus to be mounted on a four-wheel drive vehicle configured to switch between a four-wheel drive mode in which a driving force of a drive source is transmitted to main driving wheels and auxiliary driving wheels and a two-wheel drive mode in which the driving force is transmitted only to the main driving wheels, the driving force transmission apparatus being configured to adjust the driving force to be transmitted to the auxiliary driving wheels; and a control apparatus configured to control the driving force transmission apparatus by supplying a current to the driving force transmission apparatus.

The control apparatus includes:

a command value calculator configured to calculate a command value of the driving force to be transmitted to the auxiliary driving wheels based on a rotation speed difference between the main driving wheels and the auxiliary driving wheels;

a command value limiter configured to set an upper limit value of the command value and limit the command value to a value equal to or smaller than the upper limit value; and a current controller configured to control the current to be supplied to the driving force transmission apparatus so that a driving force determined based on the command value limited to the value equal to or smaller than the upper limit value is transmitted to the auxiliary driving wheels.

When the rotation speed difference increases, the command value limiter is configured to set the upper limit value smaller as a change amount of the rotation speed difference per unit time increases.

According to the driving force transmission control apparatus of the aspect described above, the driving stability of the four-wheel drive vehicle can be increased by adjusting the upper limit value of the driving force that can be transmitted to the auxiliary driving wheels while securely preventing damage to the components of the driving force transmission path through which the driving force is transmitted to the auxiliary driving wheels.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention is described with reference to FIG. 1 to FIG. 8.

Figure 1:
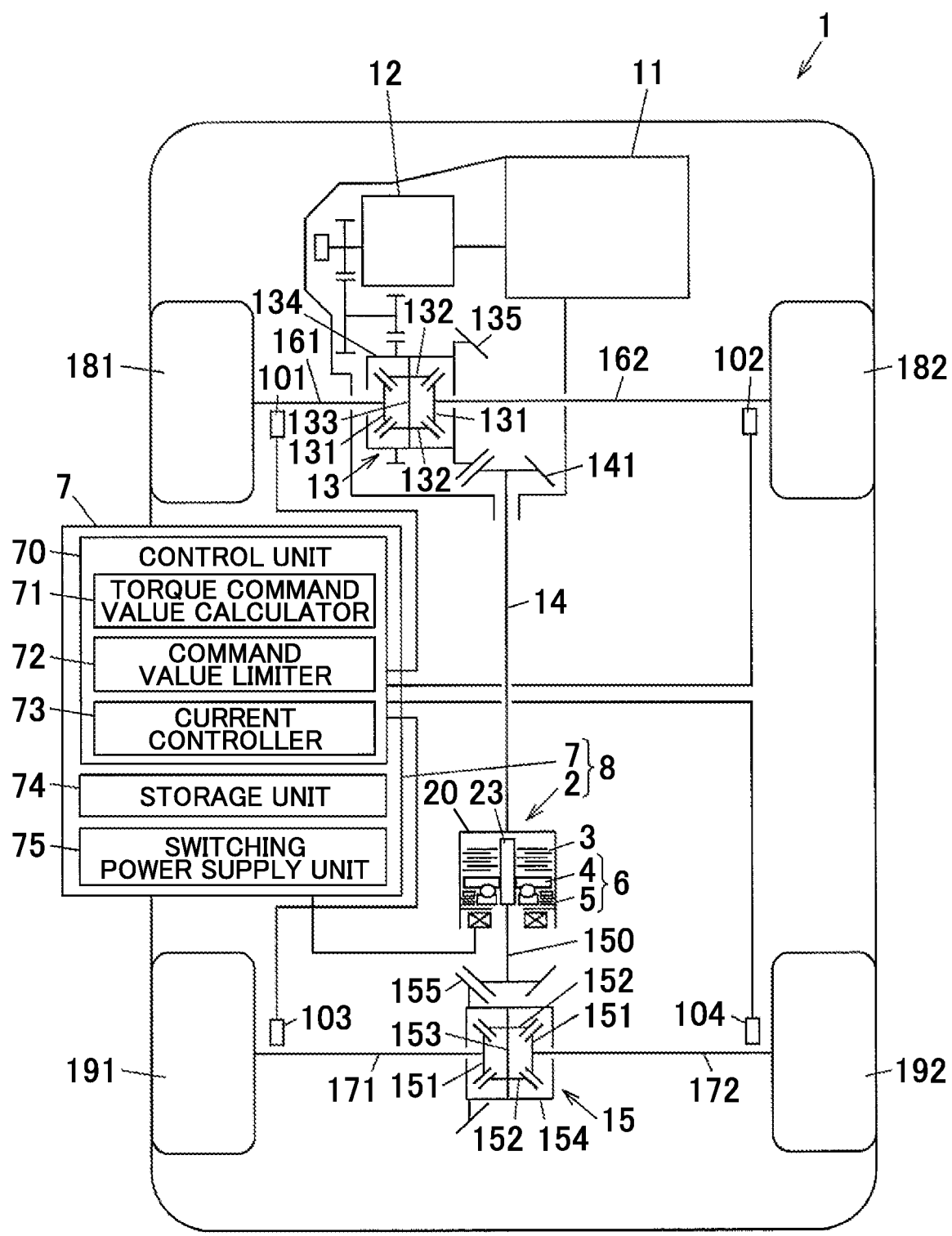
FIG. 1 is a schematic configuration diagram illustrating an example of the schematic configuration of a four-wheel drive vehicle on which a control apparatus for a driving force transmission apparatus according to an embodiment of the present invention is mounted.

FIG. 1 is a schematic configuration diagram illustrating an example of the schematic configuration of a four-wheel drive vehicle on which a control apparatus for a driving force transmission apparatus according to the embodiment of the present invention is mounted.

As illustrated in FIG. 1, a four-wheel drive vehicle 1 includes an engine 11, a transmission 12, right and left front wheels 182 and 181, and right and left rear wheels 192 and 191. The engine 11 serves as a drive source. The transmission 12 varies the speed of power output from the engine 11. The right and left front wheels 182 and 181 serve as main driving wheels to which a driving force of the engine 11 that is obtained through the speed variation executed by the transmission 12 is constantly transmitted. The right and left rear wheels 192 and 191 serve as auxiliary driving wheels to which the driving force of the engine 11 is transmitted depending on a traveling condition of the four-wheel drive vehicle 1. When the driving force of the engine 11 is transmitted to the right and left front wheels 182 and 181 and the right and left rear wheels 192 and 191, the four-wheel drive vehicle 1 is in a four-wheel drive mode. When the driving force of the engine 11 is transmitted only to the right and left front wheels 182 and 181, the four-wheel drive vehicle 1 is in a two-wheel drive mode. Wheel speed sensors 101 to 104 are arranged in relation to the right and left front wheels 182 and 181 and the right and left rear wheels 192 and 191.

A front differential 13, a propeller shaft 14, a rear differential 15, a pinion gear shaft 150, right and left front wheel-side drive shafts 162 and 161, right and left rear wheel-side drive shafts 172 and 171, a driving force transmission apparatus 2, and a control apparatus 7 are mounted on the four-wheel drive vehicle 1. The pinion gear shaft 150 transmits the driving force to the rear differential 15. The driving force transmission apparatus 2 is arranged between the propeller shaft 14 and the pinion gear shaft 150. The control apparatus 7 controls the driving force transmission apparatus 2. The driving force transmission apparatus 2 and the control apparatus 7 constitute a driving force transmission control apparatus 8.

The driving force transmission apparatus 2 is configured to adjust the driving force to be transmitted to the right and left rear wheels 192 and 191 in the four-wheel drive mode. The driving force transmission apparatus 2 transmits the driving force from the propeller shaft 14 to the pinion gear shaft 150 based on a current supplied from the control apparatus 7. The control apparatus 7 is configured to acquire wheel speed signals indicating the rotation speeds of the right and left front wheels 182 and 181 and the right and left rear wheels 192 and 191, which are detected by the wheel speed sensors 101 to 104. The control apparatus 7 controls the driving force transmission apparatus 2 by supplying a current to the driving force transmission apparatus 2. The driving force transmission apparatus 2 is also configured to interrupt the transmission of the driving force to the right and left rear wheels 192 and 191. The control apparatus 7 is also configured to switch between the four-wheel drive mode and the two-wheel drive mode by controlling the driving force transmission apparatus 2.

The driving force of the engine 11 is transmitted to the right and left front wheels 182 and 181 via the transmission 12, the front differential 13, and the right and left front wheel-side drive shafts 162 and 161. The front differential 13 includes a pair of side gears 131 and 131, a pair of pinion gears 132 and 132, a pinion gear shaft 133, and a front differential case 134. The side gears 131 and 131 are coupled to the right and left front wheel-side drive shafts 162 and 161 so as not to be rotatable relative to the right and left front wheel-side drive shafts 162 and 161. The pinion gears 132 and 132 mesh with the side gears 131 and 131 with their gear axes set orthogonal to each other. The pinion gear shaft 133 supports the pinion gears 132 and 132. The front differential case 134 houses the side gears 131 and 131, the pinion gears 132 and 132, and the pinion gear shaft 133.

A ring gear 135 is fixed to the front differential case 134. The ring gear 135 meshes with a pinion gear 141 provided at the end of the propeller shaft 14 on a front side of the vehicle. The end of the propeller shaft 14 on a rear side of the vehicle is coupled to a housing 20 of the driving force transmission apparatus 2. The driving force transmission apparatus 2 includes an inner shaft 23 arranged so as to be rotatable relative to the housing 20. The pinion gear shaft 150 is coupled to the inner shaft 23 so as not to be rotatable relative to the inner shaft 23. Details of the driving force transmission apparatus 2 are described later.

The rear differential 15 includes a pair of side gears 151 and 151, a pair of pinion gears 152 and 152, a pinion gear shaft 153, a rear differential case 154, and a ring gear 155. The side gears 151 and 151 are coupled to the right and left rear wheel-side drive shafts 172 and 171 so as not to be rotatable relative to the right and left rear wheel-side drive shafts 172 and 171. The pinion gears 152 and 152 mesh with the side gears 151 and 151 with their gear axes set orthogonal to each other. The pinion gear shaft 153 supports the pinion gears 152 and 152. The rear differential case 154 houses the side gears 151 and 151, the pinion gears 152 and 152, and the pinion gear shaft 153. The ring gear 155 is fixed to the rear differential case 154, and meshes with the pinion gear shaft 150.

Figure 2:
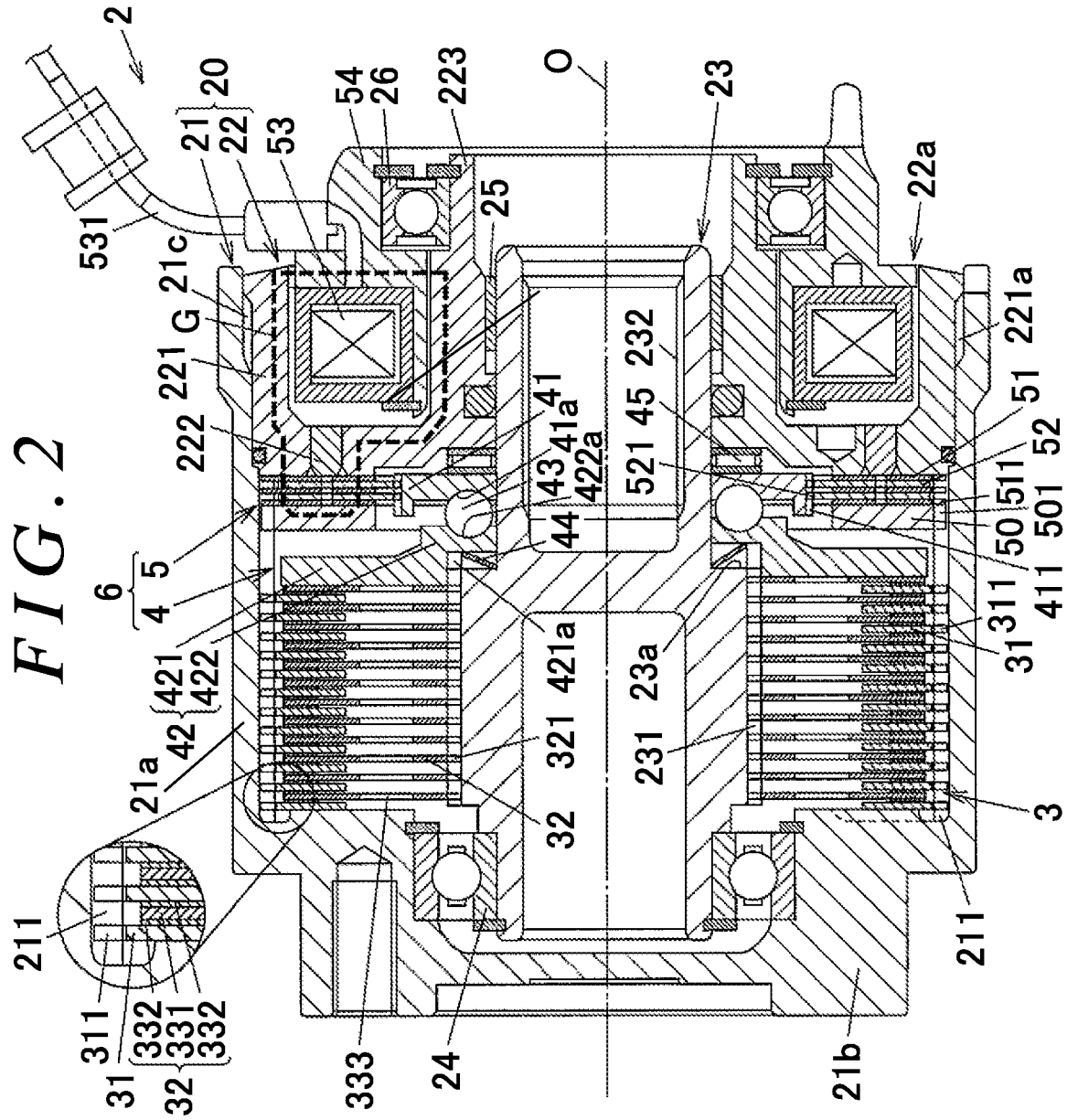
FIG. 2 is a sectional view illustrating an example of the structure of the driving force transmission apparatus.

FIG. 2 is a sectional view illustrating an example of the structure of the driving force transmission apparatus 2. In FIG. 2, an upper side with respect to a rotation axis O is an active state (torque transmissive state) of the driving force transmission apparatus 2, and a lower side with respect to the rotation axis O is an inactive state (non-torque transmissive state) of the driving force transmission apparatus 2. A direction parallel to the rotation axis O is hereinafter referred to as an axial direction.

The driving force transmission apparatus 2 includes the housing 20, the tubular inner shaft 23, a main clutch 3, a cam mechanism 4, and an electromagnetic clutch mechanism 5. The housing 20 is formed of a front housing 21 and a rear housing 22. The inner shaft 23 is supported so as to be coaxially rotatable relative to the housing 20. The main clutch 3 is arranged between the housing 20 and the inner shaft 23. The cam mechanism 4 generates a thrust force for pressing the main clutch 3. The electromagnetic clutch mechanism 5 actuates the cam mechanism 4 by being supplied with a current from the control apparatus 7. The cam mechanism 4 and the electromagnetic clutch mechanism 5 constitute an actuator 6 configured to generate a pressing force for pressing the main clutch 3 based on a current supplied from the control apparatus 7. The housing 20 is filled with lubricating oil (not illustrated). The driving force transmission apparatus 2 transmits the driving force to the right and left rear wheels 192 and 191 by the main clutch 3.

The front housing 21 has a bottomed cylindrical shape integrally including a cylindrical portion 21a and a bottom portion 21b. An internal thread 21c is formed on the inner surface of the cylindrical portion 21a at its open end. The propeller shaft 14 (see FIG. 1) is coupled to the bottom portion 21b of the front housing 21 via, for example, a joint spider. The front housing 21 has a plurality of outer spline protrusions 211 that extend in the axial direction and are provided on the inner peripheral surface of the cylindrical portion 21a.

The rear housing 22 is formed of a first annular member 221, a second annular member 222, and a third annular member 223. The first annular member 221 is formed of a magnetic material such as iron. The second annular member 222 is integrally joined to an inner peripheral side of the first annular member 221 by welding or the like, and is formed of a non-magnetic material such as austenitic stainless steel. The third annular member 223 is integrally joined to an inner peripheral side of the second annular member 222 by welding or the like, and is formed of a magnetic material such as iron. An annular housing space 22a is formed between the first annular member 221 and the third annular member 223. The housing space 22a houses an electromagnetic coil 53. An external thread 221a is formed on the outer peripheral surface of the first annular member 221. The external thread 221a engages with the internal thread 21c of the front housing 21.

The inner shaft 23 is supported on an inner peripheral side of the housing 20 by a ball bearing 24 and a needle roller bearing 25. The inner shaft 23 has a plurality of inner spline protrusions 231 that extend in the axial direction and are provided on the outer peripheral surface of the inner shaft 23. A spline fitting portion 232 is formed on the inner surface of the inner shaft 23 at its one end. One end of the pinion gear shaft 150 (see FIG. 1) is fitted to the spline fitting portion 232 so that the pinion gear shaft 150 is not rotatable relative to the inner shaft 23.

The main clutch 3 is formed of a plurality of outer main clutch plates 31 and a plurality of inner main clutch plates 32 that are arranged alternately along the axial direction. A frictional slide between the outer main clutch plates 31 and the inner main clutch plates 32 is lubricated with the lubricating oil. The outer main clutch plates 31 rotate together with the front housing 21, and the inner main clutch plates 32 rotate together with the inner shaft 23. The outer main clutch plates 31 have a plurality of engagement protrusions 311 that engage with the outer spline protrusions 211 of the front housing 21 and are provided on the outer peripheral edges of the outer main clutch plates 31. Through the engagement between the engagement protrusions 311 and the outer spline protrusions 211, the rotation of the outer main clutch plates 31 relative to the front housing 21 is restricted, and the outer main clutch plates 31 are movable in the axial direction relative to the front housing 21.

The inner main clutch plates 32 have a plurality of engagement protrusions 321 that engage with the inner spline protrusions 231 of the inner shaft 23 and are provided on the inner peripheral edges of the inner main clutch plates 32. Through the engagement between the engagement protrusions 321 and the inner spline protrusions 231, the rotation of the inner main clutch plates 32 relative to the inner shaft 23 is restricted, and the inner main clutch plates 32 are movable in the axial direction relative to the inner shaft 23. The inner main clutch plate 32 includes a disc-shaped base 331 and friction members 332. The base 331 is formed of a metal. The friction members 332 are attached to both faces of the base 331. A plurality of oil holes 333 are formed in the base 331 on an inner side with respect to the part where the friction members 332 are attached. The lubricating oil flows through the oil holes 333. Oil grooves (not illustrated) are formed in the inner main clutch plate 32 on the faces where the base 331 and the friction members 332 are in contact with each other. The lubricating oil flows along the oil grooves.

The cam mechanism 4 includes a pilot cam 41, a main cam 42, and a plurality of cam balls 43. The pilot cam 41 receives a rotational force of the housing 20 via the electromagnetic clutch mechanism 5. The main cam 42 serves as a pressing member configured to press the main clutch 3 in the axial direction. The cam balls 43 are arranged between the pilot cam 41 and the main cam 42.

The main cam 42 integrally has a pressing portion 421 having an annular plate shape, and a cam portion 422. The pressing portion 421 presses the main clutch 3 by being brought into contact with the inner main clutch plate 32 at one end of the main clutch 3. The cam portion 422 is provided on an inner peripheral side of the main cam 42 with respect to the pressing portion 421. Spline engagement portions 421a formed on the inner peripheral edge of the pressing portion 421 engage with the inner spline protrusions 231 of the inner shaft 23, thereby restricting rotation of the main cam 42 relative to the inner shaft 23. The main cam 42 is urged away from the main clutch 3 in the axial direction by a coned disc spring 44 arranged between the main cam 42 and a stepped face 23a formed on the inner shaft 23.

The pilot cam 41 has spline protrusions 411 on its outer peripheral edge. The spline protrusions 411 receive, from the electromagnetic clutch mechanism 5, a rotational force for rotating the pilot cam 41 relative to the main cam 42. A needle roller thrust bearing 45 is arranged between the pilot cam 41 and the third annular member 223 of the rear housing 22. A plurality of cam grooves 41a and 422a are formed on surfaces where the pilot cam 41 and the cam portion 422 of the main cam 42 face each other. The axial depths of the cam grooves 41a and 422a vary along a circumferential direction. The cam balls 43 are arranged between the cam grooves 41a of the pilot cam 41 and the cam grooves 422a of the main cam 42.

Through the rotation of the pilot cam 41 relative to the main cam 42, the cam mechanism 4 generates a pressing force for pressing the main clutch 3. The main clutch 3 receives the pressing force from the cam mechanism 4, and the outer main clutch plates 31 and the inner main clutch plates 32 are brought into frictional contact with each other. The driving force is transmitted by the friction force.

The electromagnetic clutch mechanism 5 includes an armature 50, a plurality of outer pilot clutch plates 51, a plurality of inner pilot clutch plates 52, the electromagnetic coil 53, and an annular yoke 54. The yoke 54 retains the electromagnetic coil 53, and is formed of a magnetic material. The electromagnetic coil 53 is retained by the yoke 54, and is housed in the housing space 22a of the rear housing 22. The yoke 54 is supported on the third annular member 223 of the rear housing 22 by a ball bearing 26. The outer peripheral surface of the yoke 54 faces the inner peripheral surface of the first annular member 221. The inner peripheral surface of the yoke 54 faces the outer peripheral surface of the third annular member 223.

The electromagnetic coil 53 is supplied with a current from the control apparatus 7 via an electric cable 531 as a coil current. When the electromagnetic coil 53 is energized, a magnetic flux is generated in a magnetic path G including the yoke 54, the first annular member 221 and the third annular member 223 of the rear housing 22, the outer pilot clutch plates 51, the inner pilot clutch plates 52, and the armature 50.

The outer pilot clutch plates 51 and the inner pilot clutch plates 52 are disc-shaped members formed of a magnetic material such as iron, and are arranged alternately along the axial direction between the armature 50 and the rear housing 22. In the outer pilot clutch plates 51 and the inner pilot clutch plates 52, a plurality of arc-shaped slits for preventing a short circuit of the magnetic flux are formed at positions juxtaposed to the second annular member 222 of the rear housing 22 in the axial direction.

The outer pilot clutch plates 51 have a plurality of engagement protrusions 511 that engage with the outer spline protrusions 211 of the front housing 21 and are provided on the outer peripheral edges of the outer pilot clutch plates 51. The inner pilot clutch plates 52 have a plurality of engagement protrusions 521 that engage with the spline protrusions 411 of the pilot cam 41 and are provided on the inner peripheral edges of the inner pilot clutch plates 52. A frictional slide between the outer pilot clutch plates 51 and the inner pilot clutch plates 52 is lubricated with the lubricating oil similarly to the main clutch 3.

The armature 50 is an annular member formed of a magnetic material such as iron. A plurality of engagement protrusions 501 are formed on an outer peripheral portion of the armature 50. The engagement protrusions 501 engage with the outer spline protrusions 211 of the front housing 21. Thus, the armature 50 is movable in the axial direction relative to the front housing 21, and rotation of the armature 50 relative to the front housing 21 is restricted.

The electromagnetic clutch mechanism 5 attracts the armature 50 toward the yoke 54 by a magnetic force generated through the energization of the electromagnetic coil 53. Through the movement of the armature 50, a friction force is generated between the outer pilot clutch plates 51 and the inner pilot clutch plates 52. The outer pilot clutch plates 51 and the inner pilot clutch plates 52 are pressed toward the rear housing 22 by the armature 50 and brought into frictional contact with each other.

In the driving force transmission apparatus 2, a rotational force generated based on the current supplied to the electromagnetic coil 53 is transmitted to the pilot cam 41 through the actuation of the electromagnetic clutch mechanism 5, the pilot cam 41 rotates relative to the main cam 42, and the cam balls 43 roll along the cam grooves 41a and 422a. Through the rolling motion of the cam balls 43, a thrust force for pressing the main clutch 3 is generated in the main cam 42, and a friction force is generated between the outer main clutch plates 31 and the inner main clutch plates 32. With the friction force, the driving force transmission apparatus 2 transmits the driving force between the housing 20 and the inner shaft 23, and outputs the driving force to the pinion gear shaft 150.

As illustrated in FIG. 1, the control apparatus 7 includes a control unit 70, a storage unit 74, and a switching power supply unit 75. The control unit 70 includes a central processing unit (CPU). The storage unit 74 stores, for example, a program to be executed by the CPU. The switching power supply unit 75 supplies a coil current to the electromagnetic coil 53 of the driving force transmission apparatus 2 by switching a voltage of a direct current (DC) power supply such as a battery. The switching power supply unit 75 includes a switching element such as a transistor, and generates the coil current by switching the DC voltage based on a pulse width modulation (PWM) signal output from the control unit 70.

The CPU executes the program stored in the storage unit 74, and therefore the control unit 70 functions as a torque command value calculator 71, a command value limiter 72, and a current controller 73. The torque command value calculator 71 calculates a torque command value, which is a command value (target value) of the driving force to be transmitted to the right and left rear wheels 192 and 191. The command value limiter 72 sets an upper limit value of the torque command value, and limits the torque command value to a value equal to or smaller than the upper limit value. The current controller 73 controls the coil current to be supplied to the driving force transmission apparatus 2 so that the driving force determined based on the torque command value limited to the value equal to or smaller than the upper limit value is transmitted to the right and left rear wheels 192 and 191. The storage unit 74 stores a plurality of maps in a non-volatile memory in addition to the program. The maps are used in control processing described later. A part or all of the functions of the torque command value calculator 71, the command value limiter 72, and the current controller 73 may be implemented by a circuit such as an application-specific integrated circuit (ASIC) or a field-programmable gate array (FPGA).

Figure 3:
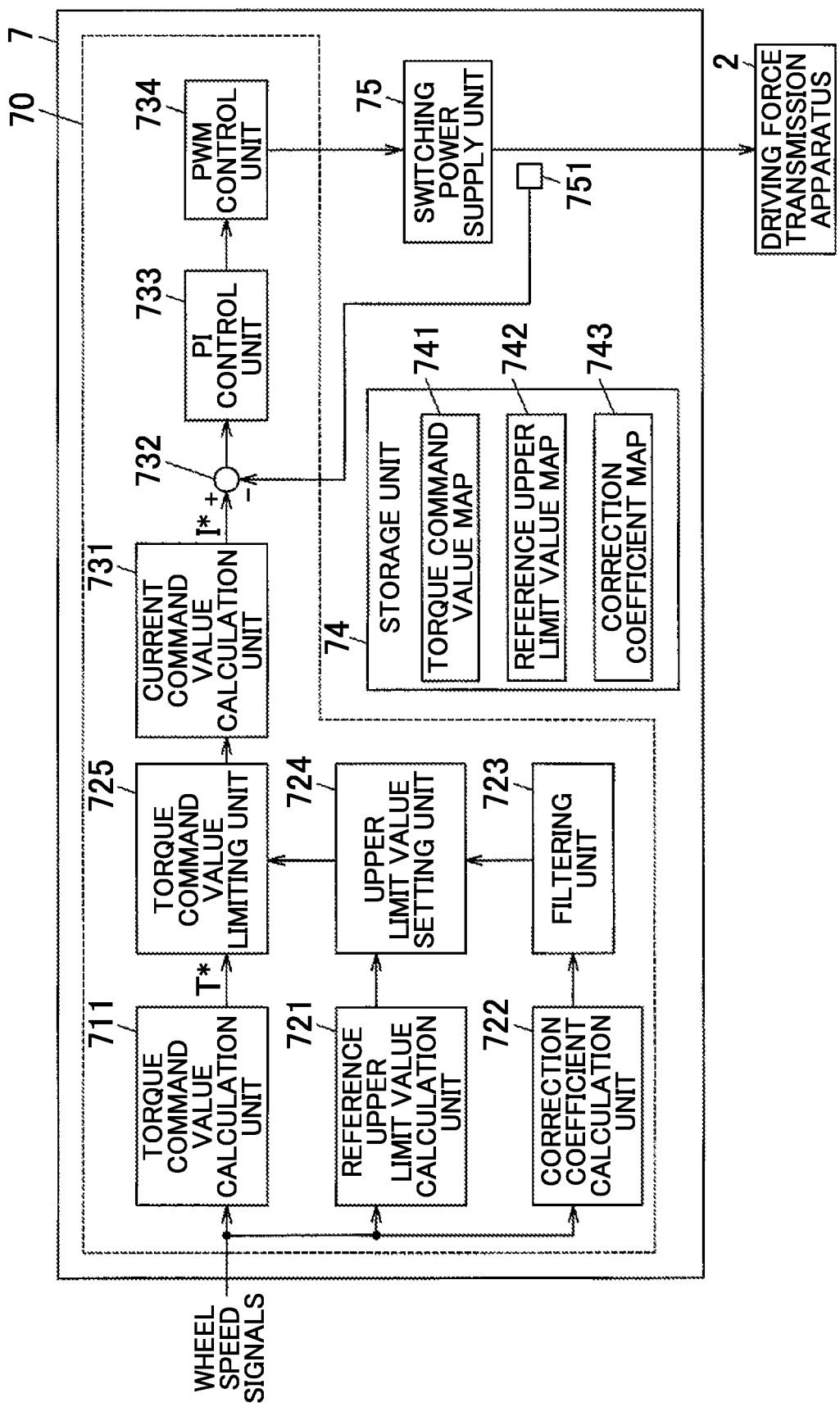
FIG. 3 is a control block diagram illustrating an example of the control configuration of the control apparatus.

FIG. 3 is a control block diagram illustrating an example of the control configuration of the control apparatus 7. The control unit 70 executes each processing operation in the control block in every predetermined calculation period (for example, 5 ms). The storage unit 74 stores a torque command value map 741, a reference upper limit value map 742, and a correction coefficient map 743 in the non-volatile memory.

The control unit 70 causes a torque command value calculation unit 711 to calculate a torque command value T* based on wheel speed signals of the right and left front wheels 182 and 181 and the right and left rear wheels 192 and 191, which are output through detection executed by the wheel speed sensors 101 to 104. The torque command value calculation unit 711 calculates the torque command value T* by referring to the torque command value map 741 based on a front-rear wheel rotation speed difference, which is a difference between an average rotation speed of the right and left front wheels 182 and 181 and an average rotation speed of the right and left rear wheels 192 and 191.

Figure 4:
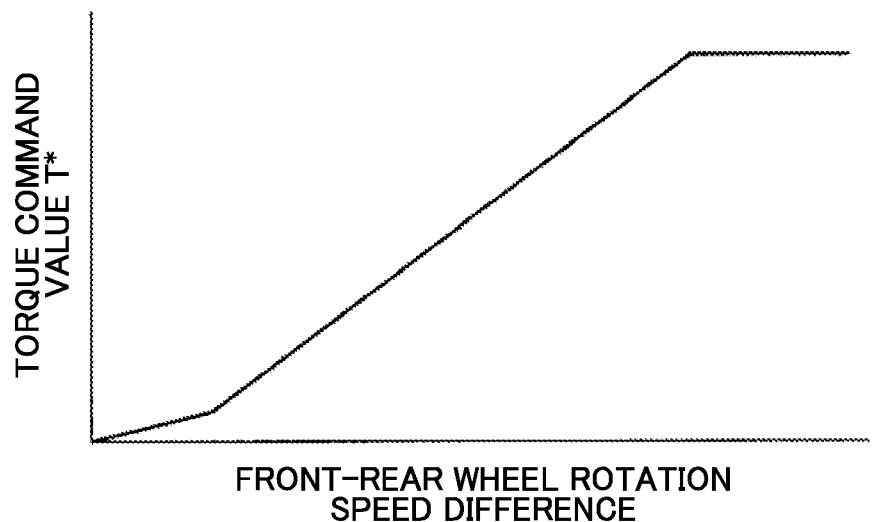
FIG. 4 is a graph illustrating an example of a torque command value map.

FIG. 4 is a graph illustrating an example of the torque command value map 741. The torque command value map 741 defines a relationship in which the torque command value T* increases as the front-rear wheel rotation speed difference increases. The processing operation of the torque command value calculation unit 711 is a processing operation executed by the control unit 70 as the torque command value calculator 71.

The control unit 70 causes a reference upper limit value calculation unit 721 to calculate a reference upper limit value by referring to the reference upper limit value map 742 based on the front-rear wheel rotation speed difference, and causes a correction coefficient calculation unit 722 to calculate a correction coefficient by referring to the correction coefficient map 743 based on a change amount of the front-rear wheel rotation speed difference per unit time. The correction coefficient calculated by the correction coefficient calculation unit 722 is smoothed with a predetermined time constant by a filtering unit 723. An upper limit value setting unit 724 multiplies the reference upper limit value by the correction coefficient subjected to the filtering processing by the filtering unit 723. The product is set as an upper limit value.

When the torque command value T* is larger than the upper limit value set by the upper limit value setting unit 724, a torque command value limiting unit 725 replaces the torque command value T* with the upper limit value. When the torque command value T* is equal to or smaller than the upper limit value set by the upper limit value setting unit 724, the torque command value limiting unit 725 directly outputs the torque command value T*. That is, the torque command value limiting unit 725 limits the torque command value T* to a value equal to or smaller than the upper limit value set by the upper limit value setting unit 724.

Figure 5:
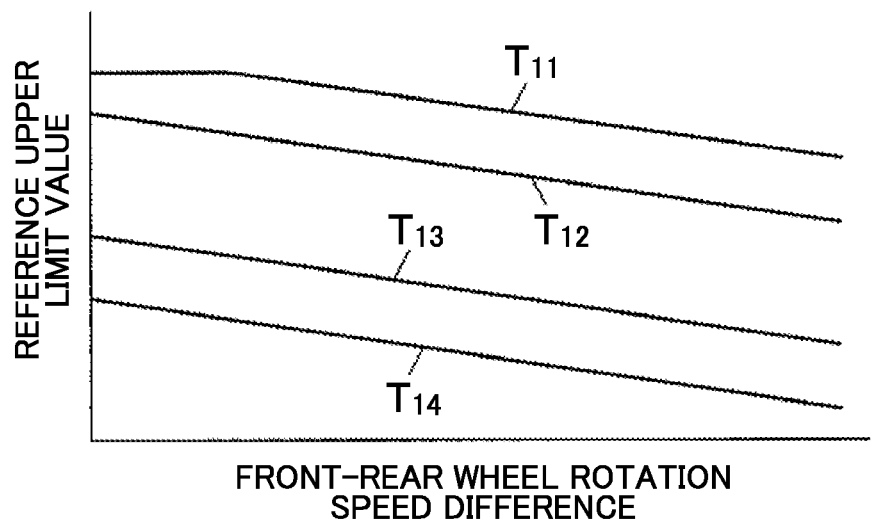
FIG. 5 is a graph illustrating an example of a reference upper limit value map.

FIG. 5 is a graph illustrating an example of the reference upper limit value map 742. In this embodiment, the reference upper limit value calculation unit 721 determines the reference upper limit value based on the front-rear wheel rotation speed difference and an estimated temperature of the main clutch 3 so that the reference upper limit value decreases as the front-rear wheel rotation speed difference increases and as the estimated temperature of the main clutch 3 decreases. The reference upper limit value map 742 defines a relationship between the front-rear wheel rotation speed difference and the reference upper limit value at a plurality of estimated temperatures $T_{11}$ to $T_{14}$. The reference upper limit value calculation unit 721 determines the reference upper limit value through interpolation based on the estimated temperature of the main clutch 3. Among the estimated temperatures $T_{11}$ to $T_{14}$, the estimated temperature $T_{11}$ is highest and the estimated temperature $T_{14}$ is lowest. At least the estimated temperature $T_{14}$ is equal to or lower than 0° C. At each of the estimated temperatures $T_{11}$ to $T_{14}$, the reference upper limit value decreases as the front-rear wheel rotation speed difference increases. At an arbitrary front-rear wheel rotation speed difference, the reference upper limit value decreases as the estimated temperature of the main clutch 3 decreases.

The method for calculating the estimated temperature of the main clutch 3 is not particularly limited, but the estimated temperature of the main clutch 3 may be determined based on, for example, an integrated value obtained by integrating, over a predetermined time, a product of the front-rear wheel rotation speed difference and the torque command value T* that is a cumulative load on the main clutch 3. The estimated temperature of the main clutch 3 may be determined by adding an ambient temperature or a vehicle speed to the integrated value. When the temperature of the main clutch 3 is low, the viscosity of the lubricating oil increases, and the driving force to be transmitted to the right and left rear wheels 192 and 191 tends to overshoot its target value. This tendency is remarkable when the temperature of the main clutch 3 is equal to or lower than 0° C.

Figure 6:
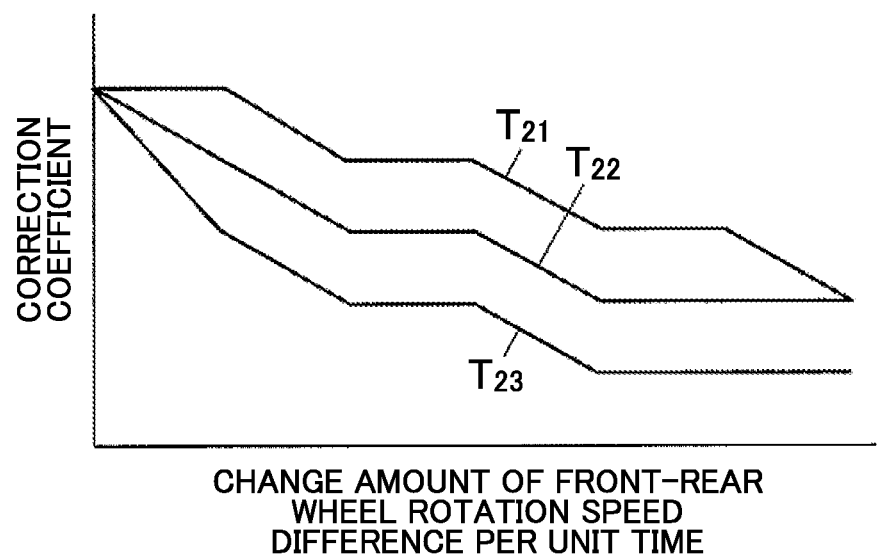
FIG. 6 is a graph illustrating an example of a correction coefficient map.

FIG. 6 is a graph illustrating an example of the correction coefficient map 743. In this embodiment, the correction coefficient calculation unit 722 determines the correction coefficient so that the correction coefficient decreases as the change amount of the front-rear wheel rotation speed difference per unit time increases and as the estimated temperature of the main clutch 3 decreases. The correction coefficient is a positive value smaller than 1.

The correction coefficient map 743 defines a relationship between the front-rear wheel rotation speed difference and the correction coefficient at a plurality of estimated temperatures $T_{21}$ to $T_{23}$. The correction coefficient calculation unit 722 determines the correction coefficient through interpolation based on the estimated temperature of the main clutch 3. Among the estimated temperatures $T_{21}$ to $T_{23}$, the estimated temperature $T_{21}$ is highest and the estimated temperature $T_{23}$ is lowest. At least the estimated temperature $T_{23}$ is equal to or lower than 0° C. At each of the estimated temperatures $T_{21}$ to $T_{23}$, the correction coefficient decreases as the change amount of the front-rear wheel rotation speed difference per unit time increases. At an arbitrary change amount of the front-rear wheel rotation speed difference per unit time, the correction coefficient decreases as the estimated temperature of the main clutch 3 decreases.

When the front-rear wheel rotation speed difference increases, the correction coefficient calculation unit 722 uses the correction coefficient determined based on the maximum value of the change amount of the front-rear wheel rotation speed difference per unit time in the subsequent calculation of the upper limit value for a predetermined time. Specifically, when a change amount of the front-rear wheel rotation speed difference per unit time that is calculated in each calculation period is smaller than a change amount of the front-rear wheel rotation speed difference per unit time in a previous calculation period while the front-rear wheel rotation speed difference increases, a correction coefficient determined in that calculation period is replaced with a correction coefficient in the previous calculation period.

When a current value of the correction coefficient calculated by the correction coefficient calculation unit 722 in each calculation period is larger than a previous value of the correction coefficient in the previous calculation period, the filtering unit 723 increases the time constant of the filtering processing as compared to a case where the current value is smaller than the previous value. Thus, when the change amount of the front-rear wheel rotation speed difference per unit time is decreasing, the correction coefficient subjected to the filtering processing by the filtering unit 723 gently increases.

The processing operations of the reference upper limit value calculation unit 721, the correction coefficient calculation unit 722, the filtering unit 723, the upper limit value setting unit 724, and the torque command value limiting unit 725 are processing operations executed by the control unit 70 as the command value limiter 72. When the front-rear wheel rotation speed difference increases, the command value limiter 72 sets, through the processing operations of the correction coefficient calculation unit 722, the filtering unit 723, and the upper limit value setting unit 724, a smaller upper limit value for the torque command value T* as the change amount of the front-rear wheel rotation speed difference per unit time increases. The torque command value limiting unit 725 may execute the processing of limiting the torque command value T* to a value equal to or smaller than the upper limit value only when the estimated temperature of the main clutch 3 is lower than a predetermined value. In this case, it is desirable that, for example, a value equal to or lower than 0° C. be used as the predetermined value.

The control unit 70 serves as the current controller 73 to execute processing operations of a current command value calculation unit 731, a deviation calculation unit 732, a proportional-integral (PI) control unit 733, and a PWM control unit 734. The current command value calculation unit 731 calculates a current command value I* corresponding to the torque command value T* output from the torque command value limiting unit 725. The current command value I* is a target value of the coil current to be supplied to the electromagnetic coil 53 of the driving force transmission apparatus 2. The deviation calculation unit 732 calculates a deviation between an actual current value I and the current command value I*. The actual current value I is a detection value from a current sensor 751 configured to detect the coil current output from the switching power supply unit 75.

The PI control unit 733 executes PI calculation for the deviation calculated by the deviation calculation unit 732, and calculates a duty ratio of a PWM signal to be output to the switching power supply unit 75 so that the actual current value I is closer to the current command value I*. Thus, current feedback control is executed. The PWM control unit 734 generates a PWM signal for turning ON or OFF the switching element of the switching power supply unit 75 based on the duty ratio calculated by the PI control unit 733, and outputs the PWM signal to the switching power supply unit 75. The switching power supply unit 75 outputs a coil current determined based on the duty ratio to the electromagnetic coil 53 of the driving force transmission apparatus 2.

Figure 7A:
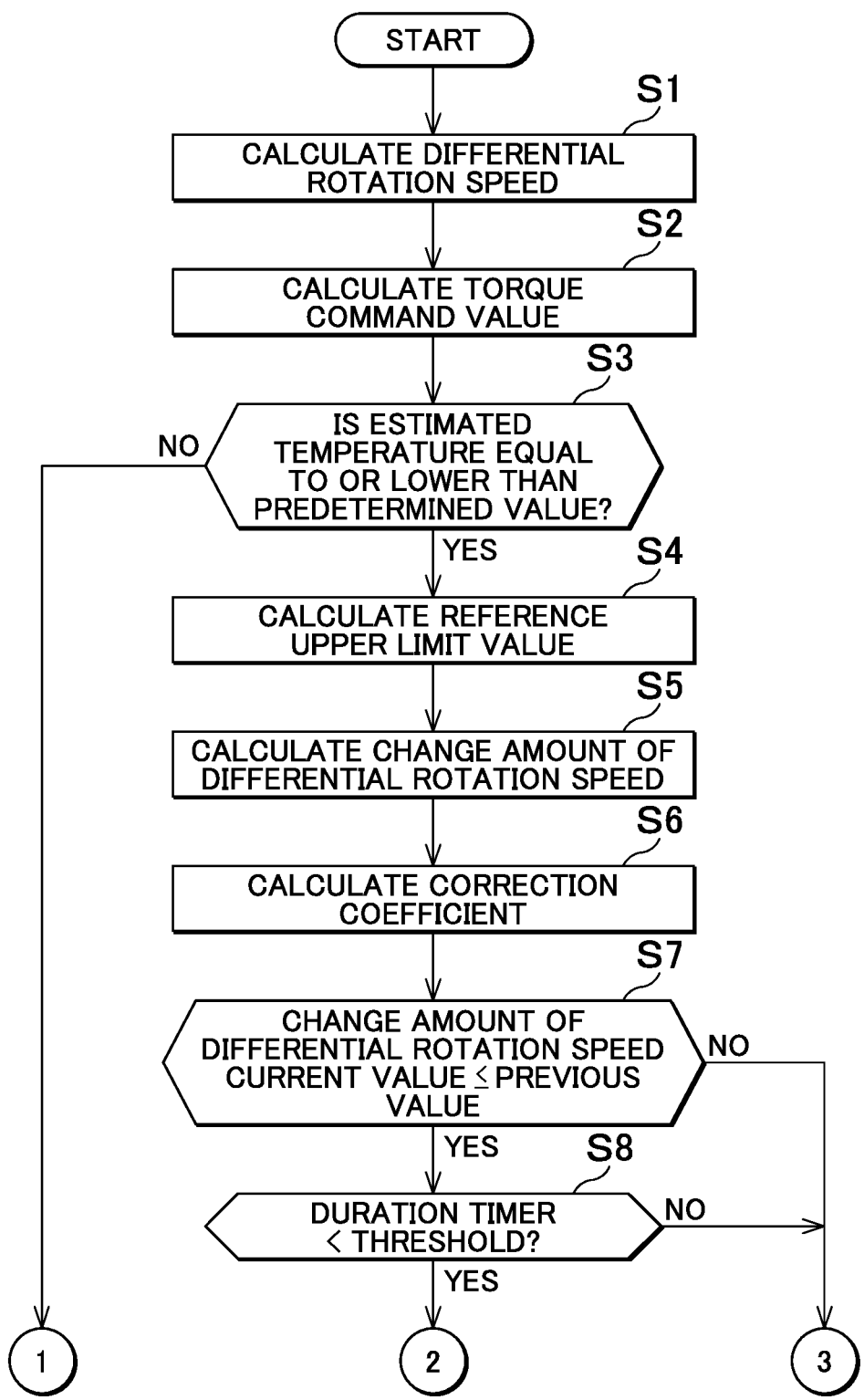
FIG. 7A and FIG. 7B show a flowchart illustrating an example of a processing procedure to be executed by a control unit as a torque command value calculator and a command value limiter in one calculation period.
Figure 7B:
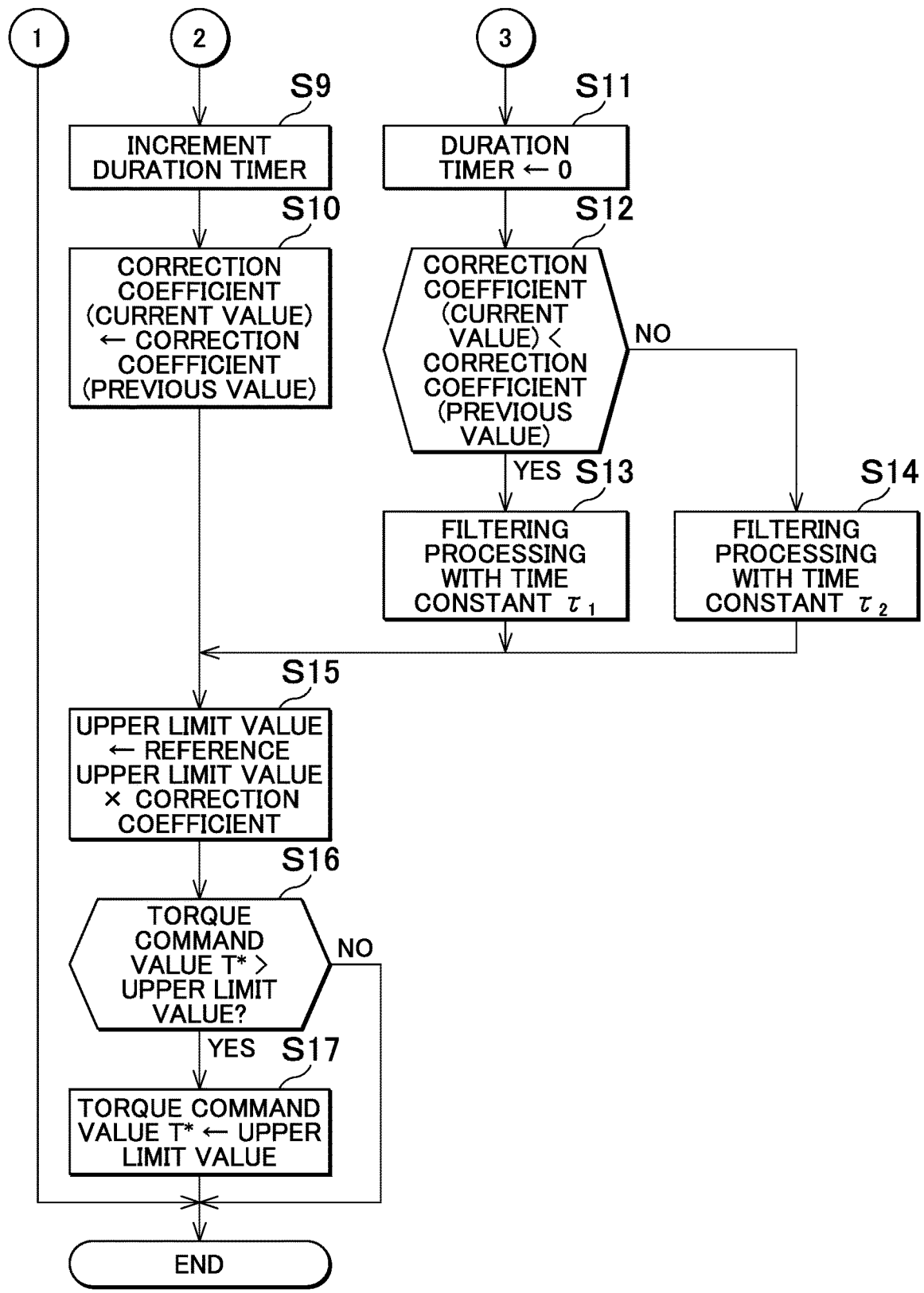

FIG. 7A and FIG. 7B show a flowchart illustrating an example of a processing procedure to be executed by the control unit 70 of the control apparatus 7 as the torque command value calculator 71 and the command value limiter 72 in one calculation period.

The control unit 70 calculates a differential rotation speed (front wheel rotation speed—rear wheel rotation speed), which is a difference between an average rotation speed of the right and left front wheels 182 and 181 per unit time (front wheel rotation speed) and an average rotation speed of the right and left rear wheels 192 and 191 per unit time (rear wheel rotation speed), based on wheel speed signals output through detection executed by the wheel speed sensors 101 to 104 (Step S1). The differential rotation speed corresponds to the front-rear wheel rotation speed difference described above. The control unit 70 calculates a torque command value T* by referring to the torque command value map 741 based on the differential rotation speed determined in Step S1 (Step S2).

Next, the control unit 70 determines whether the estimated temperature of the main clutch 3 is equal to or lower than a predetermined value (Step S3). When the estimated temperature of the main clutch 3 is higher than the predetermined value (S3: No), the processing illustrated in the flowchart is terminated. When the estimated temperature of the main clutch 3 is equal to or lower than the predetermined value (S3: Yes), the control unit 70 calculates a reference upper limit value by referring to the reference upper limit value map 742 based on the differential rotation speed determined in Step S1 (Step S4).

Next, the control unit 70 calculates a change amount of the differential rotation speed (Step S5). The change amount of the differential rotation speed is a difference between a differential rotation speed in a previous calculation period and a differential rotation speed in a current calculation period, and corresponds to the change amount of the front-rear wheel rotation speed difference per unit time described above. For example, the change amount of the differential rotation speed has a large positive value when the difference between the front wheel rotation speed and the rear wheel rotation speed is increasing due to a slip of the right and left front wheels 182 and 181. The control unit 70 calculates a correction coefficient by referring to the correction coefficient map 743 based on the change amount of the differential rotation speed per unit time (Step S6).

Next, the control unit 70 compares the current value of the change amount of the differential rotation speed that is determined in Step S5 and the previous value of the change amount of the differential rotation speed that is determined in the previous calculation period, thereby determining a relationship in the magnitudes (Step S7). When the current value is equal to or smaller than the previous value in the determination of Step S7 (S7: Yes), that is, when the change amount of the differential rotation speed is constant or decreasing, the control unit 70 executes processing operations of Step S8 and subsequent steps. When the current value is larger than the previous value (S7: No), that is, when the change amount of the differential rotation speed is increasing, the control unit 70 executes processing operations of Steps S11 to S14.

In the processing operation of Step S8, the control unit 70 determines whether the value of a duration timer is smaller than a threshold. The duration timer is a timer provided so that, when the front-rear wheel rotation speed difference increases, the correction coefficient determined based on the maximum value of the change amount of the front-rear wheel rotation speed difference per unit time is used in the subsequent calculation of the upper limit value for a predetermined time. For example, the threshold in Step S8 is 500 ms. That is, when the change amount of the differential rotation speed is increasing, the correction coefficient is updated in every calculation period. When the change amount of the differential rotation speed is decreasing, the correction coefficient is kept at a relatively small value in a case where the change amount of the differential rotation speed is maximum.

When the value of the duration timer is smaller than the threshold in the determination processing of Step S8 (S8: Yes), the control unit 70 increments the duration timer (Step S9), and replaces the current value of the correction coefficient with the previous value in the previous calculation period (Step S10). The increment in Step S9 corresponds to the calculation period.

When the determination result of Step S7 or Step S8 is No, the control unit 70 sets the value of the duration timer to zero (Step S11), and determines a relationship in the magnitudes between the current value and the previous value of the correction coefficient (Step S12). When the current value of the correction coefficient is smaller than the previous value in this determination (S12: Yes), the control unit 70 executes filtering processing for the correction coefficient with a time constant $\tau_1$ (Step S13). When the current value of the correction coefficient is equal to or larger than the previous value in the determination of Step S12 (S12: No), the control unit 70 executes filtering processing for the correction coefficient with a time constant $\tau_2$ (Step S14). The time constant $\tau_2$ is larger than the time constant $\tau_1$. When the correction coefficient is increasing, the correction coefficient gently increases as compared to the case where the correction coefficient is decreasing. For example, the time constant $\tau_1$ is 0 seconds, and the time constant $\tau_2$ is 1 second.

After the processing operations described above, the control unit 70 calculates an upper limit value by multiplying the reference upper limit value by the correction coefficient (Step S15). Then, the control unit 70 determines whether the torque command value T* determined in Step S2 is larger than the upper limit value (Step S16). When the torque command value T* is larger than the upper limit value (S16: Yes), the control unit 70 replaces the torque command value T* with the upper limit value determined in Step S15 (Step S17). That is, the torque command value T* is limited to a value equal to or smaller than the upper limit value. When the torque command value T* is equal to or smaller than the upper limit value, the control unit 70 executes processing operations as the current controller 73 by using the torque command value T* determined in Step S2 without replacing the torque command value T* with the upper limit value.

Figure 8:
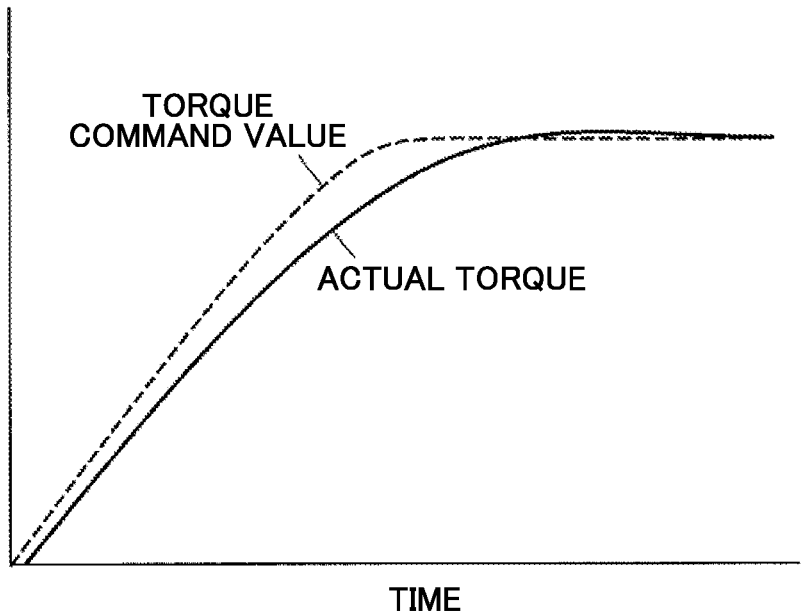
FIG. 8 is a graph illustrating an example of changes in a torque command value and an actual torque when a front-rear wheel rotation speed difference increases.
Figure 9:
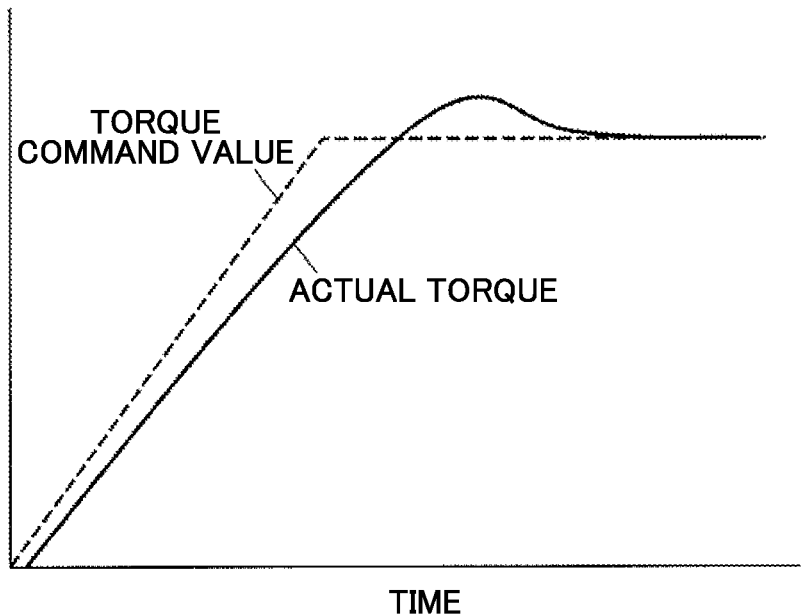
FIG. 9 is a graph illustrating a comparative example of the changes in the torque command value and the actual torque when the front-rear wheel rotation speed difference increases.

FIG. 8 and FIG. 9 are graphs illustrating examples of changes in a torque command value when the front-rear wheel rotation speed difference increases due to, for example, a slip of any one of the right and left front wheels 182 and 181 and an actual torque that is an actual driving force transmitted to the right and left rear wheels 192 and 191. FIG. 8 is an example of the case where the torque command value is limited to the upper limit value that is set as described above. FIG. 9 is a comparative example of a case where the processing of limiting the torque command value is not executed. In FIG. 8 and FIG. 9, the horizontal axis represents a time axis, and the vertical axis represents the magnitude of a torque.

According to this embodiment, the correction coefficient decreases as the change amount of the front-rear wheel rotation speed difference per unit time increases. The upper limit value is set by a product of the correction coefficient and the reference upper limit value. Therefore, the upper limit value is set smaller as the change amount of the front-rear wheel rotation speed difference per unit time increases, thereby limiting the torque command value. Thus, an overshoot in the actual torque is suppressed as illustrated in FIG. 8. When the processing of limiting the torque command value is not executed, the actual torque overshoots as illustrated in, for example, FIG. 9. Therefore, it is necessary to increase the strengths of the portions such as the propeller shaft 14 and the rear differential 15 for transmitting the driving force to the right and left rear wheels 192 and 191. Alternatively, it is necessary to significantly limit the driving force to be transmitted to the right and left rear wheels 192 and 191 in consideration of the overshoot.

That is, according to this embodiment, the upper limit value is set smaller as the change amount of the front-rear wheel rotation speed difference per unit time increases, whereby a necessary driving force can be distributed toward the right and left rear wheels 192 and 191 while securely preventing damage to the components of the driving force transmission path through which the driving force is transmitted to the right and left rear wheels 192 and 191. Thus, the driving stability of the four-wheel drive vehicle can be increased.

According to this embodiment, the reference upper limit value and the correction coefficient decrease as the estimated temperature of the main clutch 3 decreases. Therefore, the overshoot in the driving force to be transmitted to the right and left rear wheels 192 and 191 can be suppressed even at a low temperature at which the viscosity of the lubricating oil is high. When the front-rear wheel rotation speed difference increases, the correction coefficient determined based on the maximum value of the change amount of the front-rear wheel rotation speed difference per unit time is used in the subsequent calculation of the upper limit value for a predetermined time. Thus, the overshoot is suppressed more securely.

The present invention may be modified as appropriate without departing from the spirit of the present invention. For example, the configuration of the drive system of the four-wheel drive vehicle 1 and the arrangement position of the driving force transmission apparatus 2 are not limited to those illustrated in FIG. 1, but may be modified variously. The actuator 6 configured to generate the pressing force for pressing the main clutch 3 is not limited to the actuator 6 using the cam mechanism 4 and the electromagnetic clutch mechanism 5. For example, the cam mechanism 4 may be actuated by an electric motor, or the main clutch 3 may be pressed by a hydraulic pressure of an oil pump to be actuated by an electric motor.

What is claimed is:

1. A driving force transmission control apparatus, comprising:
   a driving force transmission apparatus to be mounted on a four-wheel drive vehicle configured to switch between a four-wheel drive mode in which a driving force of a drive source is transmitted to main driving wheels and auxiliary driving wheels and a two-wheel drive mode in which the driving force is transmitted only to the main driving wheels, the driving force transmission apparatus being configured to adjust the driving force to be transmitted to the auxiliary driving wheels; and
   a control apparatus configured to control the driving force transmission apparatus by supplying a current to the driving force transmission apparatus, wherein
   the control apparatus includes:
      a command value calculator configured to calculate a command value of the driving force to be transmitted to the auxiliary driving wheels based on a rotation speed difference between the main driving wheels and the auxiliary driving wheels;
      a command value limiter configured to set an upper limit value of the command value and limit the command value to a value equal to or smaller than the upper limit value; and
      a current controller configured to control the current to be supplied to the driving force transmission apparatus so that a driving force determined based on the command value limited to the value equal to or smaller than the upper limit value is transmitted to the auxiliary driving wheels, and
   when the rotation speed difference increases, the command value limiter is configured to set the upper limit value smaller as a change amount of the rotation speed difference per unit time increases.

2. The driving force transmission control apparatus according to claim 1, wherein
   the driving force transmission apparatus is configured to transmit the driving force to the auxiliary driving wheels by a clutch including a plurality of clutch plates whose frictional slide is lubricated with lubricating oil, and
   the command value limiter is configured to determine a reference upper limit value based on the rotation speed difference so that the reference upper limit value decreases as the rotation speed difference increases, determine a correction coefficient that decreases as the change amount of the rotation speed difference per unit time increases, and set the upper limit value by multiplying the reference upper limit value by the correction coefficient.

3. The driving force transmission control apparatus according to claim 2, wherein the command value limiter is configured to determine the reference upper limit value based on the rotation speed difference and an estimated temperature of the clutch so that the reference upper limit value decreases as the rotation speed difference increases and as the estimated temperature of the clutch decreases.

4. The driving force transmission control apparatus according to claim 2, wherein the command value limiter is configured to determine the correction coefficient so that the correction coefficient decreases as the change amount of the rotation speed difference per unit time increases and as an estimated temperature of the clutch decreases.

5. The driving force transmission control apparatus according to claim 2, wherein, when the rotation speed difference increases, the correction coefficient is determined based on a maximum value of the change amount of the rotation speed difference per unit time in subsequent calculation of the upper limit value for a predetermined time.

6. The driving force transmission control apparatus according to claim 2, wherein the control apparatus is configured to execute processing of limiting the command value to the value equal to or smaller than the upper limit value only when an estimated temperature of the clutch is lower than a predetermined value.

7. The driving force transmission control apparatus according to claim 2, wherein the command value limiter is configured to execute filtering processing for the correction coefficient with a predetermined time constant.

\* \* \* \* \*